United States Patent
Kobayashi

(10) Patent No.: US 7,463,302 B2
(45) Date of Patent: Dec. 9, 2008

(54) FOCUS CONTROL DEVICE AND FOCUS CONTROL METHOD

(75) Inventor: Fumikazu Kobayashi, Tokyo (JP)

(73) Assignee: Sony Corporation (JP)

( * ) Notice: Subject to any disclaimer, the term of this patent is extended or adjusted under 35 U.S.C. 154(b) by 540 days.

(21) Appl. No.: 11/339,212

(22) Filed: Jan. 25, 2006

(65) Prior Publication Data

US 2006/0192886 A1 Aug. 31, 2006

(30) Foreign Application Priority Data

Jan. 28, 2005 (JP) ............................. P2005-021852

(51) Int. Cl.
*G03B 13/00* (2006.01)

(52) U.S. Cl. ...................... 348/345; 348/347; 348/349; 348/353; 348/365; 396/89

(58) Field of Classification Search ................. 348/345, 348/349, 353, 347, 365; 396/89
See application file for complete search history.

(56) References Cited

U.S. PATENT DOCUMENTS 4,992,817 A * 2/1991 Aoyama et al. ............... 396/96
5,223,886 A * 6/1993 Ishida et al. ................. 396/130
6,512,549 B1 * 1/2003 Iijima et al. ................. 348/349
6,879,343 B2 * 4/2005 Yamazaki et al. ........... 348/351

FOREIGN PATENT DOCUMENTS

JP 2966458 B2 9/1991

* cited by examiner

*Primary Examiner*—Tuan Ho
*Assistant Examiner*—Quang V Le
(74) *Attorney, Agent, or Firm*—Lerner, David, Littenberg, Krumholz & Mentlik, LLP

(57) ABSTRACT

A focus control device includes a lens unit including a focus lens; a focus lens driving mechanism that moves the focus lens to achieve an in-focus state; a focus status detector that detects a focus status acquired by the focus lens; a drive control unit that controls the focus lens driving mechanism so that the detected focus status is the in-focus state; a change detector that detects that an evaluation value for focus control has changed by a threshold value or more; and an execution control unit that waits in a state in which the drive control unit does not control the focus lens driving mechanism for a waiting time starting from a time when the change detector detects that the evaluation value has changed by the predetermined threshold value or more, and that causes the drive control unit to control the focus lens driving mechanism when the state in which the evaluation value has changed by the predetermined threshold value or more is maintained until the waiting time has elapsed.

5 Claims, 5 Drawing Sheets

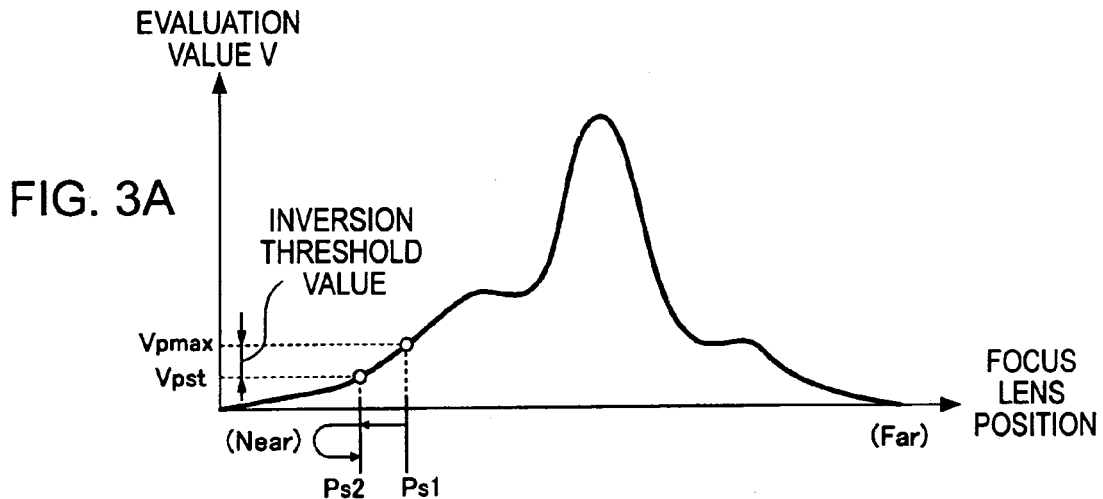
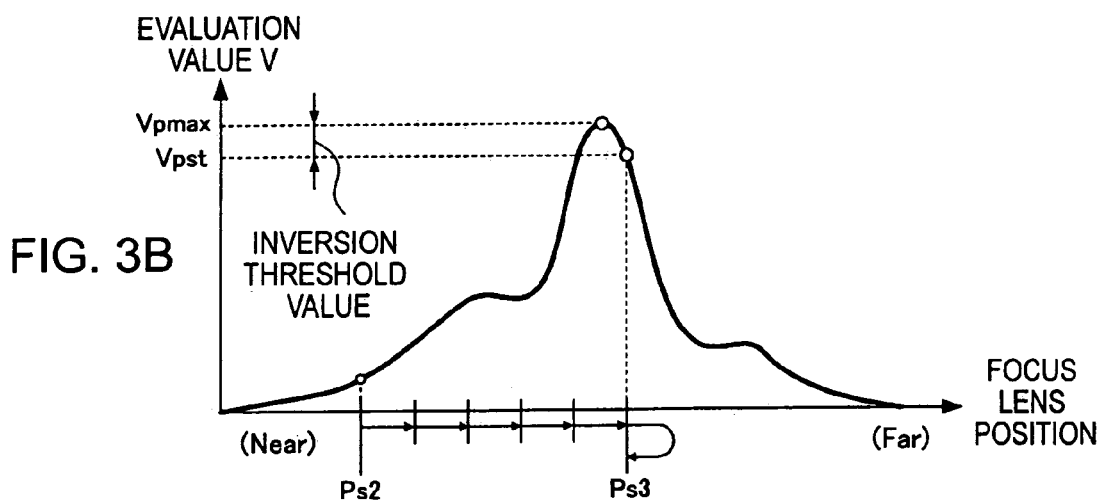
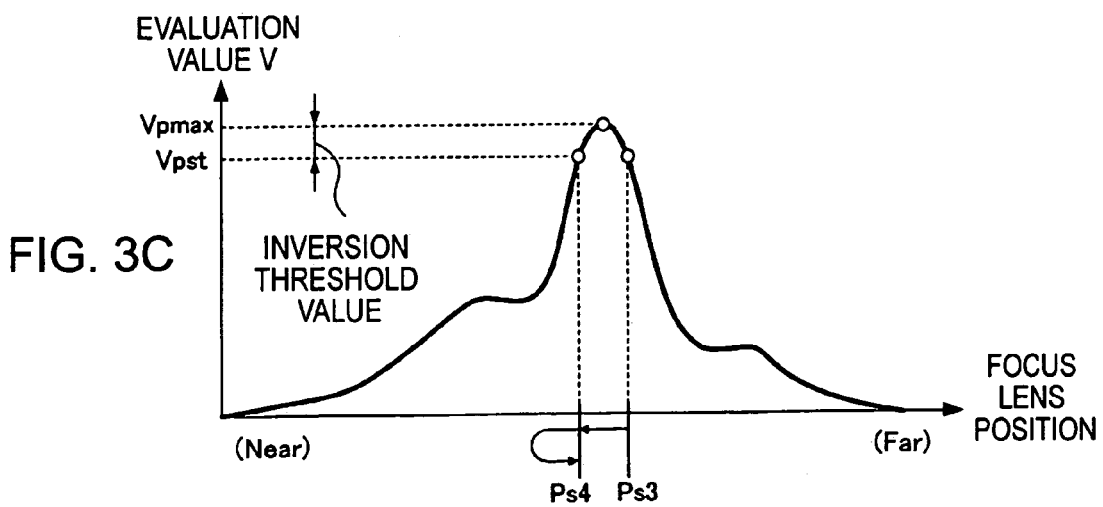

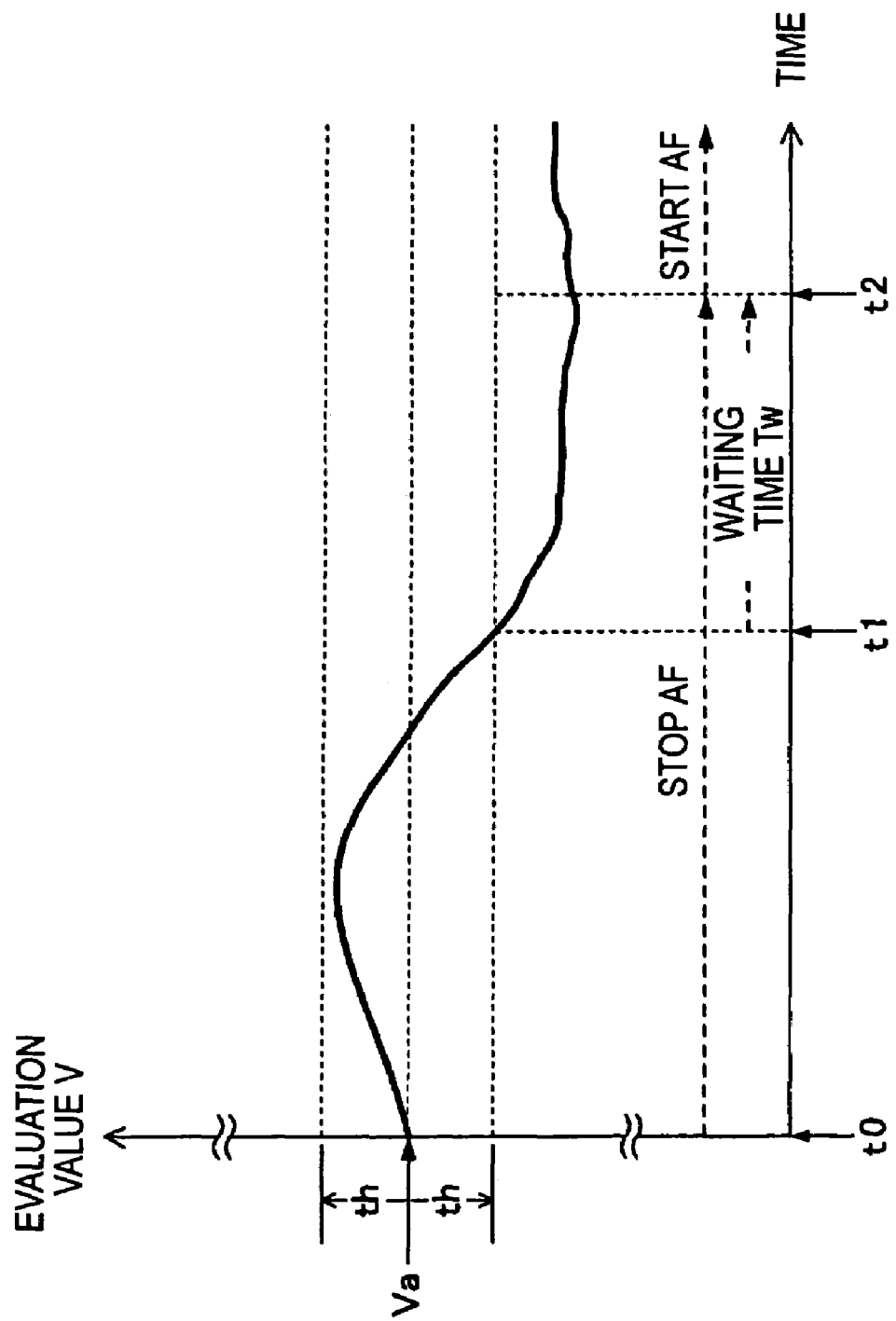

FOCUS CONTROL DEVICE AND FOCUS CONTROL METHOD

CROSS-REFERENCE TO RELATED APPLICATIONS

The present application claims priority from Japanese Patent Application No. JP 2005-021852 filed on Jan. 28, 2005, the disclosure of which is hereby incorporated by reference herein.

BACKGROUND OF THE INVENTION

The present invention relates to a focus control device that is provided in an image pickup apparatus, such as a video camera, and that controls a focus status of an image acquired by a lens portion and to a focus control method for the focus control device.

Nowadays, most of image pickup apparatuses, such as portable consumer video cameras and still cameras, have an automatic focus function. As a method for such automatic focus control, a contrast method using contrast information of an image signal acquired from image pickup light by a lens portion is widely known. In addition, as the contrast method, a hill-climbing method is described, for example, in Japanese Patent No. 2966458.

For example, such an automatic focus function always monitors whether it is in an in-focus state or not. If it is determined that it enters a not-in-focus state, an automatic focus operation is immediately performed. Accordingly, recovery to the in-focus state can be achieved as quickly as possible.

Generally, portable video cameras, which are assumed to be used by general end users, are used such that the powers of the portable video cameras are turned off at a time other than a time when photographing (recording) is actually performed. For example, when a user is carrying a portable video camera for an event and is not performing photographing, the power of the portable video camera is turned off. In other words, portable video cameras are not used to continuously perform photographing over a long time or over a long period.

As apparatus systems using video cameras, monitoring camera systems are also available. For example, a video camera used for such monitoring camera systems is installed in a fixed position and is continuously operated over a long period.

In the existing situation, in many cases, an automatic focus function provided in a portable video camera apparatus is also provided as an automatic focus function in a monitoring camera. This means that such a monitoring camera also starts an automatic focus operation immediately in response to a change to a not-in-focus state, as described above.

A change from an in-focus state to a not-in-focus state may be detected not only when a human being or an object enters an image pickup area but also when the brightness of a picked-up image changes.

As described above, a monitoring camera continuously operates over a long period. Thus, although it depends on the environment in which the monitoring camera is installed, the frequency of the automatic focus operation performed by the monitoring camera during a certain period is significantly greater than the frequency of the automatic focus operation performed by a portable video camera.

In order to achieve an in-focus state using the automatic focus function, a focus lens in a lens unit is moved along an optical axis direction. In order to move the focus lens, a physical driving mechanism including a motor, a gear, and the like is provided. Thus, performing an automatic focus operation with high frequency means performing an operation of the above-mentioned driving mechanism with high frequency. This causes further wear of components forming the driving mechanism, thus resulting in a reduction in durability of the monitoring camera apparatus.

SUMMARY OF THE INVENTION

A focus control device according to an embodiment of the present invention includes lens means including a focus lens; a focus lens driving mechanism that moves the focus lens to achieve an in-focus state; focus status detection means for detecting a focus status acquired by the focus lens; drive control means for controlling the focus lens driving mechanism so that the detected focus status is the in-focus state; change detection means for detecting that an evaluation value for focus control has changed from a value corresponding to the in-focus state by a predetermined threshold value or more in accordance with the detected focus status; and execution control means for waiting in a state in which the drive control means does not control the focus lens driving mechanism for a predetermined waiting time starting from a point in time when the change detection means detects that the evaluation value has changed by the predetermined threshold value or more, and for causing the drive control means to control the focus lens driving mechanism when it is recognized that the state in which the evaluation value has changed by the predetermined threshold value or more is maintained until the waiting time has elapsed in accordance with a detection result acquired from the change detection means.

In addition, a focus control method according to an embodiment of the present invention includes detecting a focus status acquired by a focus lens; controlling a focus lens driving mechanism to move the focus lens in accordance with the detected focus status so as to achieve an in-focus state; detecting that an evaluation value for focus control has changed from a value corresponding to the in-focus state by a predetermined threshold value or more in accordance with the detected focus status; and waiting in a state in which the controlling step does not control the focus lens driving mechanism for a predetermined waiting time starting from a point in time when the change detecting step detects that the evaluation value has changed by the predetermined threshold value or more, and causing the controlling step to control the focus lens driving mechanism when it is recognized that the state in which the evaluation value has changed by the predetermined threshold value or more is maintained until the waiting time has elapsed in accordance with a detection result acquired from the change detecting step.

With the foregoing structure, even if, as a focus control status of a focus lens, an evaluation value corresponding to an in-focus state has changed by a predetermined threshold value or more, an operation for driving the focus lens so as to be in the in-focus state is not performed during a period set as a waiting time starting from a point in time when the change has been detected. If the state in which the evaluation value has changed by the threshold value or more is maintained until the waiting time has elapsed, the focus lens is driven so as to be in the in-focus state. In other words, the automatic focus control starts.

Accordingly, auto focus control does not operate in response to a short-time change of an image acquired from a lens. In other words, the frequency of the automatic focus operation during a predetermined period can be reduced.

As described above, since the frequency of the automatic focus operation during a predetermined period is reduced, the frequency of driving a focus lens driving mechanism is also reduced. Thus, physical wear of components forming the focus lens driving mechanism can be suppressed. Thus, for example, the durability of an image pickup apparatus, an image pickup system, or the like actually including the lens driving mechanism is increased, and thus the reliability is improved.

BRIEF DESCRIPTION OF THE DRAWINGS

FIGS. 3A to 3C illustrate position control of a focus lens by the contrast method (hill-climbing method);

FIG. 4 illustrates a procedure for restarting automatic focus control according to the embodiment.

DETAILED DESCRIPTION

Figure 1:
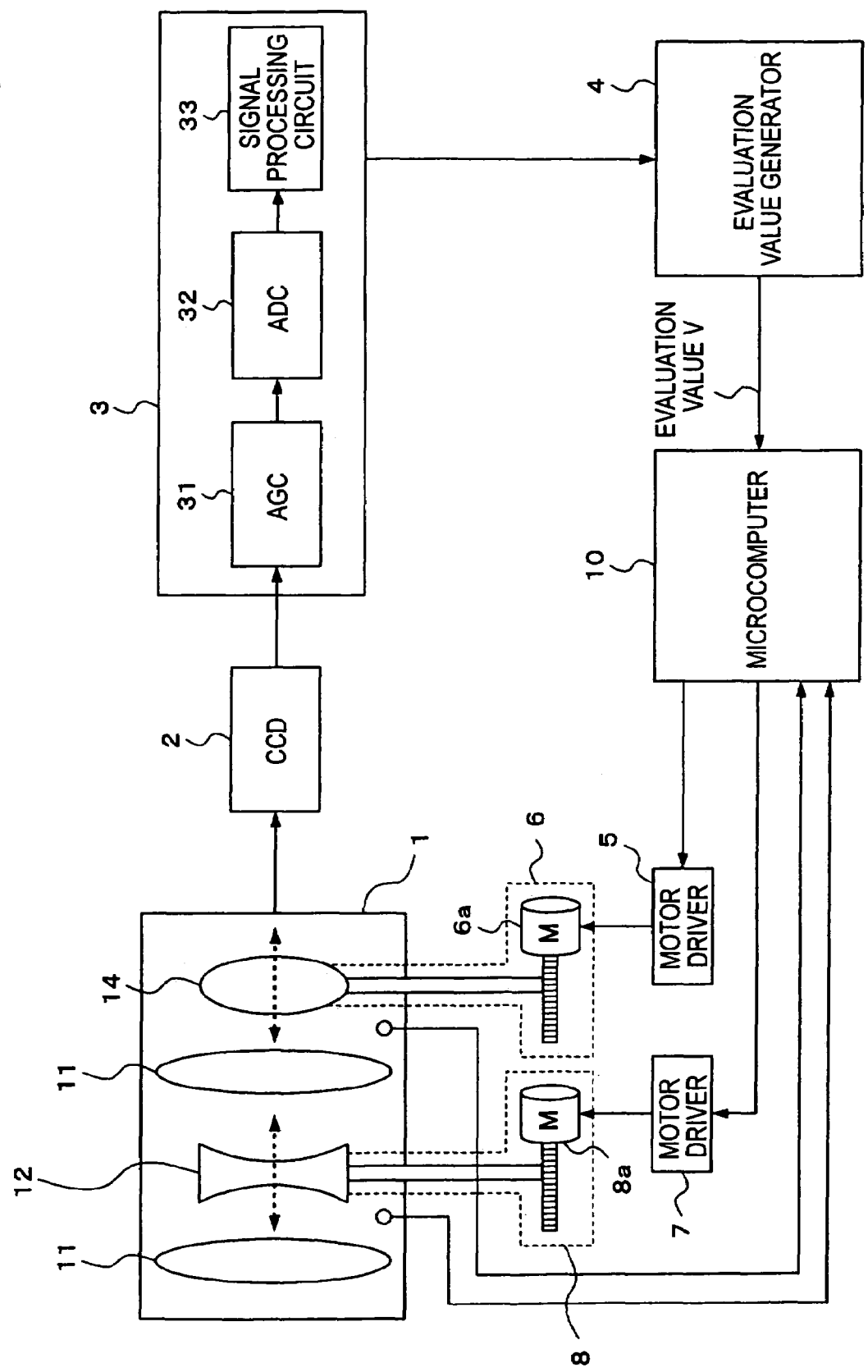
FIG. 1 is a block diagram showing an example of the structure of a video camera apparatus according to an embodiment of the present invention.

FIG. 1 shows the structure of a main portion of a video camera apparatus according to an embodiment of the present invention. For example, the video camera apparatus is installed in a predetermined position to perform photographing in a monitoring camera system.

Referring to FIG. 1, in the video camera apparatus, a lens block 1 includes, for example, a predetermined number of image pickup lenses. The lens block 1 forms an image on a light-receiving surface of a charge-coupled device (CCD) 2 using incident light as image pickup light. In this example, a fixed lens 11, a zoom lens 12, a fixed lens 13, and a focus lens 14 are shown as lenses forming the lens block 1. However, FIG. 1 simply illustrates that lenses including at least a fixed lens, a zoom lens, and a focus lens form a lens system of the lens block 1. The lens arrangement forming the lens system can be changed in an appropriate fashion.

The focus lens 14 is provided so as to be movable along an optical axis direction by a focus mechanism unit 6. By moving and adjusting the position of the focus lens 14, a focus status of image pickup light acquired by the lens block 1 can be adjusted to achieve an in-focus state.

The focus mechanism unit 6 includes, for example, a focus motor 6a and necessary various gears. The focus motor 6a is driven by a driving signal output from a motor driver 5.

The zoom lens 12 is provided so as to be movable along the optical axis direction by a zoom mechanism unit 8. The zoom magnification (angle of view) changes in accordance with the position of the zoom lens 12. In addition, the zoom mechanism unit 8 includes, for example, a zoom motor 8a and various gears. The zoom motor 8a is driven by a driving signal output from a motor driver 7.

As focus control, for example, in accordance with information, such as an evaluation value V detected by a contrast method, which will be described below, a microcomputer 10 controls the motor driver 5 to output a driving signal, and causes the focus lens 14 to be moved to a required lens position by an operation of the focus mechanism unit 6. Thus, an in-focus state corresponding to an object is achieved.

In addition, in order to optically change the zoom magnification, the microcomputer 10 controls the motor driver 7 to output a driving signal and to operate the zoom mechanism unit 8, and causes the zoom lens 12 to be moved to a required position. Thus, the angle of view (zoom magnification) for a picked-up image can be changed.

The CCD 2 is a photoelectric conversion element. The CCD 2 generates an image signal by converting image pickup light incident from the lens block 1 and focused on the light-receiving surface into an electric signal, and outputs the generated image signal to a signal processing block 3.

The photoelectric conversion element (image pickup element) is not necessarily a CCD. For example, another type of element, such as a complementary metal-oxide semiconductor (CMOS) sensor, may be adopted.

In the signal processing block 3, for example, an automatic gain control (AGC) circuit 31 performs gain adjustment and sample hold processing to perform waveform shaping of a CCD output received from the CCD 2. Then, an analog-to-digital (A/D) converter 32 performs analog-to-digital conversion on the CCD output to convert the CCD output into digital data. Then, a signal processing circuit 33 performs necessary video signal processing on the digital data acquired by the conversion. For example, in order to record a picked-up image in a recording medium (not shown), the signal processing circuit 33 properly changes the picked-up image into a video signal, and then performs predetermined compress encoding, recording encoding, and the like, to perform data recording in the recording medium. In addition, video signal processing and the like for outputting a monitor image to a display (not shown) are also performed.

The microcomputer 10 includes, for example, a central processing unit (CPU), a read-only memory (ROM), and a random-access memory (RAM). The microcomputer 10 controls the video camera apparatus.

In this example, position information representing positions of the zoom lens 12 and the focus lens 14 detected by a position sensor (for example, a magneto-resistance (MR) sensor using magneto-resistance effect) provided in a lens barrel forming the lens block 1 is input to the microcomputer 10. The microcomputer 10 uses the received position information for moving control of the zoom lens 12 and the focus lens 14. For example, if the focus motor 6a and the zoom motor 8a are stepping motors instead of linear motors or the like, position detection can be performed in accordance with the number of drive pulses output for motor driving. Thus, a sensor need not be particularly provided.

The video camera apparatus according to this embodiment has an automatic focus function adopting a contrast method. The automatic focus operation is an operation to perform control so as to automatically achieve an in-focus state without performing a manual lens operation.

An evaluation value generator 4 generates an evaluation value V used for performing an automatic focus operation based on the contrast method. In order to generate an evaluation value, the evaluation value generator 4 receives a detected value generated by the signal processing block 3.

The evaluation value V generated by the evaluation value generator 4 is input to the microcomputer 10. The microcomputer 10 performs a control operation for automatic focusing in accordance with the acquired evaluation value V. In other words, the microcomputer 10 sets the amount of driving (and the direction of driving) the focus motor 6a in accordance with the acquired evaluation value V, and controls the motor driver 5 so as to output a driving signal for driving the focus motor 6a by the driving amount (and in the driving direction). Thus, the position of the focus lens 14 is changed by moving the focus lens 14 in an appropriate direction and by an appropriate moving amount. Such an operation is performed until the focus lens 14 reaches a position corresponding to an in-focus state.

A hill-climbing method is known as one of the contrast methods. The outline of an automatic focus operation performed by the evaluation value generator 4 and the microcomputer 10 will be described with reference to FIGS. 2 and 3 by taking the hill-climbing method as an example.

Figure 2:
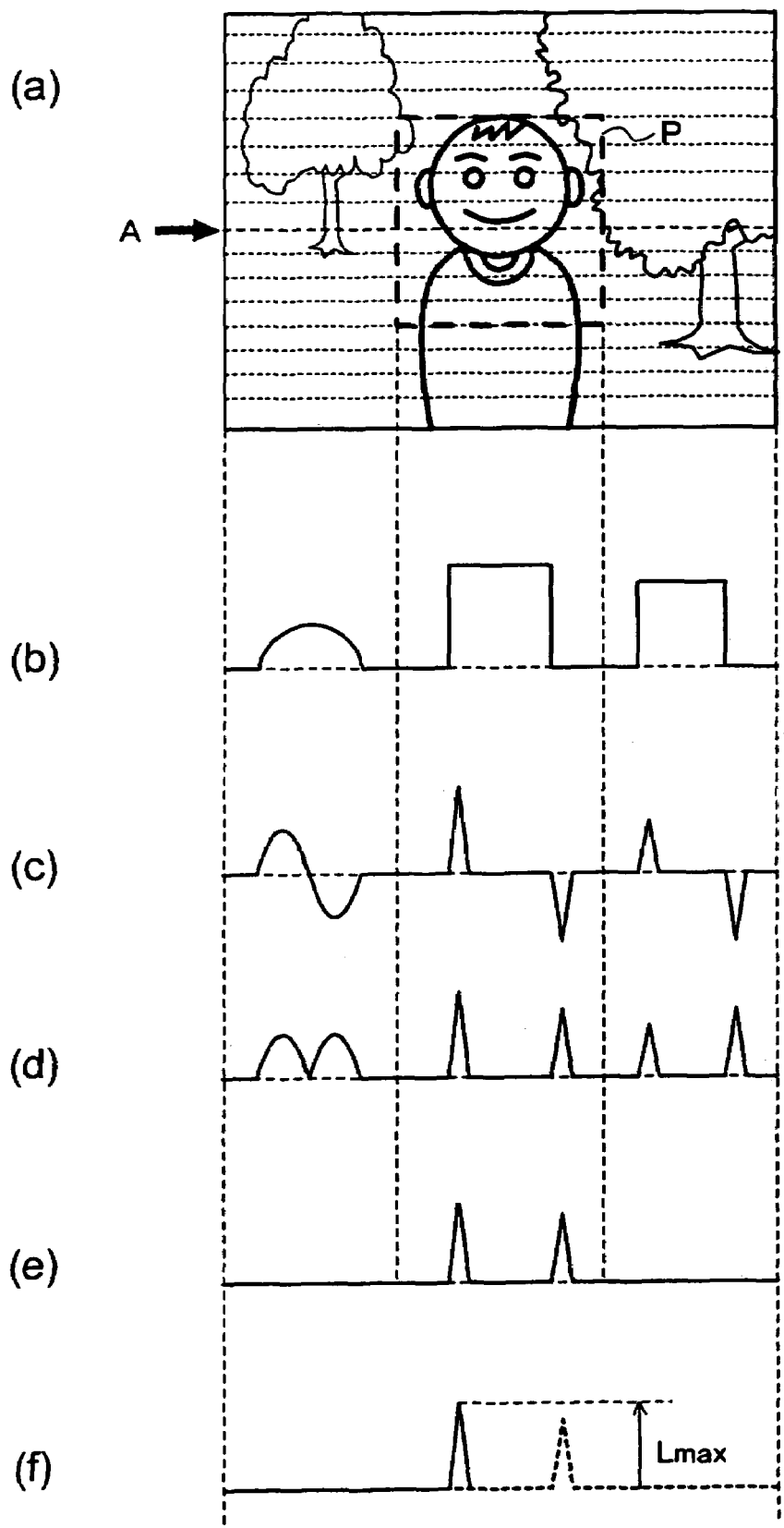
FIG. 2 illustrates a procedure for acquiring an evaluation value by a contrast method (hill-climbing method)

Part (a) of FIG. 2 shows an image picked up by the lens block 1 and acquired from the signal processing block 3. A detected value corresponding to the image is input to the evaluation value generator 4.

For example, a case where a horizontal line represented by the arrow A in part (a) of FIG. 2 is selected as a target from among many horizontal lines forming the image is considered.

The evaluation value generator 4 extracts amplitude of a luminance signal component of the horizontal line, as shown in part (b) of FIG. 2. Then, the evaluation value generator 4 acquires an amplitude value corresponding to a high-frequency component of the luminance signal, as shown in part (c) of FIG. 2, by causing the luminance signal to pass through a high-pass filter (HPF) for a predetermined characteristic (by differentiating the luminance signal). After the processing, in this example, the amplitude value of the high-frequency luminance component acquired by the HPF processing is absolutized, as shown in part (d) of FIG. 2.

Then, as shown in part (e) of FIG. 2, a portion of the signal corresponding to a predetermined image area (a frame P in part (a) of FIG. 2) is extracted. In this example, as shown in part (f) of FIG. 2, the maximum value Lmax is acquired from the amplitude in the extracted area.

For example, the evaluation value generator 4 acquires the maximum value Lmax for each horizontal line in a predetermined image area in accordance with a procedure similar to the procedure shown in FIG. 2. Then, the evaluation value generator 4 integrates the maximum values Lmax for the entire screen. The value calculated by integration serves as an evaluation value V. As is clear from the foregoing explanation, the evaluation value V is obtained in accordance with a high-frequency component of a luminance signal of an image signal. Thus, the evaluation value V represents the intensity of the contrast in a predetermined image area.

The microcomputer 10 performs automatic focus control by the hill-climbing method, as described below, using the received evaluation value V.

FIG. 3A shows the relationship between the evaluation value V acquired from an image pickup signal based on image pickup by the lens block 1 (for the sake of convenience of explanation, a change according to the time course is not considered) and the position of the focus lens 14 (the focus lens position). It is known that the evaluation value V has a characteristic of a so-called inverted V shape in which the evaluation value V reaches the peak at the focus lens position corresponding to an in-focus state.

In a case where the characteristic of the evaluation value V is represented as shown in FIGS. 3A to 3C, the focus lens position immediately before an automatic focus operation starts is, for example, a position Ps1, as shown in FIG. 3A. In order to start the automatic focus operation from this state, the microcomputer 10 moves the focus lens 14 in a Near direction or a Far direction starting from the position Ps1. In order to move the focus lens 14, as described above, the motor driver 5 is controlled so as to drive the focus motor 6a of the focus mechanism unit 6 in an appropriate driving direction and by an appropriate driving amount.

In FIGS. 3A to 3C, the Near direction represents the leftward direction along the horizontal axis, and the Far direction represents the rightward direction along the horizontal axis.

In this example, as shown in FIG. 3A, the focus lens 14 is moved from the position Ps1 in the Near direction.

In addition, the microcomputer 10 periodically (at each field/frame timing) receives the evaluation value V even when the microcomputer 10 moves the focus lens 14.

In the case shown in FIGS. 3A to 3C, when the focus lens 14 is moved in the Near direction from the position Ps1, the evaluation value V exhibits a decreasing tendency. Then, for example, when the focus lens 14 travels a certain distance from the position Ps1 in the reverse direction (Near direction) and reaches a position Ps2, the amount of reduction from the past evaluation value acquired at the position Ps1 to the present evaluation value Vpst at the present time acquired at the position Ps2 is equal to or more than a predetermined value set as an inversion threshold value.

As a hill-climbing algorithm, when the microcomputer 10 determines that the amount of reduction from the maximum evaluation value vpmax, which is the maximum value acquired after the traveling direction of the focus lens 14 inverts last time, to the present evaluation value Vpst at the present time, is equal to or more than the inversion threshold value, that is, when the microcomputer 10 determines that the subtraction of the present evaluation value Vpst from the maximum evaluation value Vpmax (that is, Vpmax−Vpst) is equal to or more than the inversion threshold value, the current traveling direction of the focus lens 14 is inverted.

Since the focus lens 14 is moved from the position Ps1, the past evaluation value corresponding to the position Ps1 serves as the maximum evaluation value Vpmax in this case. Thus, the fact that the amount of reduction from the past evaluation value (in this case, the maximum evaluation value Vpmax) acquired at the position Ps1 to the present evaluation value Vpst at the present time acquired at the position Ps2 is equal to or more than the inversion threshold value means that the subtraction of the present evaluation value Vpst from the maximum evaluation value Vpmax (that is, Vpmax−Vpst) is equal to or more than the inversion threshold value.

In this case, the focus lens 14 is moved so as to be inverted from the Near direction to the Far direction.

In an area on the Far direction side with respect to the position Ps2, the evaluation value V maintains an increasing tendency until the evaluation value V reaches the peak corresponding to the in-focus state, as shown in FIG. 3B. In this case, the maximum evaluation value is updated such that the maximum evaluation value is always equal to the present evaluation value Vpst. Thus, the subtraction of the present evaluation value Vpst from the maximum evaluation value Vpmax (that is, Vpmax−Vpst) does not reach the inversion threshold value. Thus, for example, the focus lens 14 is continuously moved in the Far direction until the focus lens 14 reaches a position Ps3, as shown in FIG. 3B. When the focus lens 14 reaches the position Ps3, it is determined that the subtraction of the present evaluation value Vpst at the present time acquired at the position Ps3 from the maximum evaluation value Vpmax, which is the peak of the evaluation value V corresponding to the in-focus position, (that is, Vpmax−Vpst) is equal to or more than the inversion threshold value. The microcomputer 10 inverts the moving direction of the focus lens 14, and moves the focus lens 14 in the Near direction.

Then, in this case, the focus lens 14 is moved in the Near direction from the position Ps3. When the focus lens 14 passes through the position corresponding to the peak of the evaluation value V and reaches a position Ps4, it is determined again that the subtraction of the present evaluation value Vpst at the present time acquired at the position Ps4 from the maximum evaluation value Vpmax, which is the peak of the evaluation value V corresponding to the in-focus position, (that is, Vpmax−Vpst) is equal to or more than the inversion threshold value. Then, the microcomputer 10 inverts the moving direction of the focus lens 14, and moves the focus lens 14 in the Far direction.

As described above, the focus lens 14 is repeatedly moved between the positions Ps3 and Ps4 across the focus lens position corresponding to the peak of the evaluation value V. In practice, after movement of the focus lens 14 between the positions Ps3 and PS4 is repeated a predetermined number of times, it is determined that the focus lens position reaches the in-focus state, and the automatic focus control stops.

In this embodiment, in order to restart automatic focus control after the in-focus state is achieved and the automatic focus control stops as described above, basically, a procedure shown in FIG. 4 is performed.

FIG. 4 shows an example of a change in the evaluation value V corresponding to the time course.

In FIG. 4, at time t0, an in-focus state is achieved by automatic focus control and an operation of automatic focus control (AF) stops. The evaluation value at a time when the in-focus state is achieved is represented as a reference evaluation value Va.

In practice, even after the in-focus state is achieved, the evaluation value V changes in accordance with the content of a picked-up image. Thus, determination of whether to restart the automatic focus operation is performed by determining whether a change between the reference evaluation value Va and the evaluation value V at the present time is equal to or more than a predetermined value. In other words, a starting threshold value th is set in advance, and it is detected whether or not the absolute value (|Va−V|) of the difference between the reference evaluation value Va and the evaluation value V at the present time is equal to or more than the starting threshold value th (|Va−V|≧th). In FIG. 4, since the amount of reduction from the evaluation value V at the present time to the reference evaluation value Va is equal to or more than the starting threshold value th at time t1, it is detected that the amount of change between the reference evaluation value Va and the evaluation value V at the present time is equal to or more than the predetermined value.

In known general video camera apparatuses, at time t1 when the amount of change between the reference evaluation value Va and the evaluation value V at the present time is equal to or more than the predetermined value, the automatic focus operation immediately restarts.

In contrast, in this embodiment, a waiting time Tw is provided. In this embodiment, the automatic focus operation does not restart and a state in which the automatic focus operation stops, which is a state before time t1, is maintained during the waiting time Tw, which is from time t1 to time t2.

Then, only in a case where "a state acquired corresponding to time t1 in which the change (difference) between the reference evaluation value Va and the evaluation value V at the present time is equal to or more than the predetermined value" is maintained at time t2 after the waiting time Tw passes, the automatic focus operation restarts after time t2. Thus, for example, when the difference between the reference evaluation value Va and the evaluation value V at the present time is returned to less than the predetermined value within the period from time t1 to time t2, a mode is reset to an operation mode in which a change to a not-in-focus state is detected, as in a time before time t1.

Figure 5:
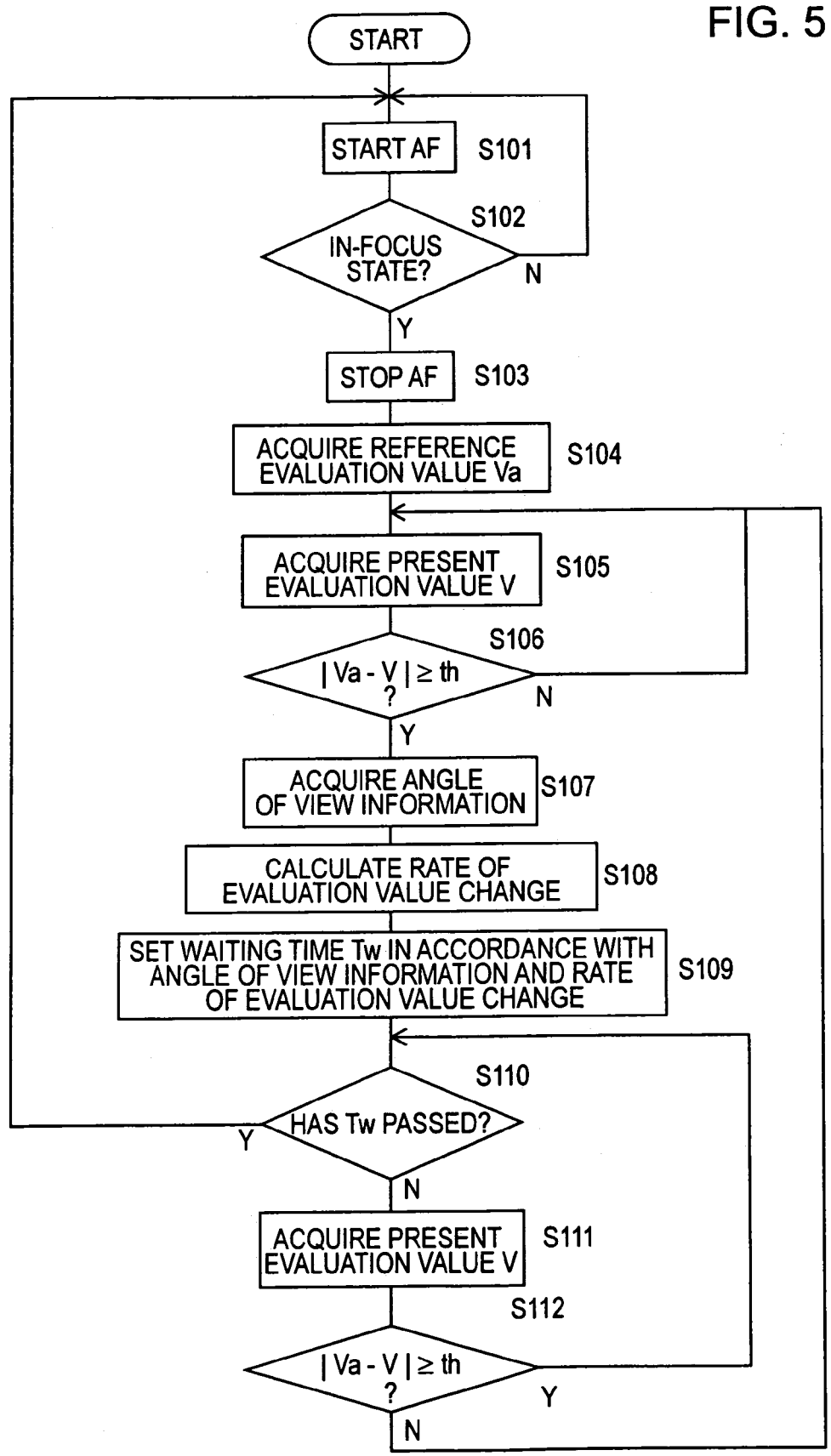
FIG. 5 is a flowchart showing a process for restarting the automatic focus control according to the embodiment.

FIG. 5 is a flowchart showing a more practical starting process of automatic focus control based on the procedure shown in FIG. 4. The process shown in FIG. 5 is also seen as a processing sequence acquired when the CPU of the microcomputer 10 executes a program stored in the ROM.

Referring to FIG. 5, in step S101, an operation of the automatic focus control (AF) starts. Since the automatic focus control starts in step S101, for example, convergence is performed such that the position of the focus lens 14 is changed to achieve an in-focus state, as described above. In step S102, it is determined whether or not it is in an in-focus state.

If it is determined that the in-focus state is achieved in step S102, the automatic focus control stops in step S103. Then, in step S104, an evaluation value V acquired corresponding to a point in time when the in-focus state is achieved is acquired as a reference evaluation value Va.

In step S105, for example, in accordance with a trigger timing in a predetermined cycle, the evaluation value acquired from the evaluation value generator 4 at the present time is acquired as a present evaluation value V.

Then, in step S106, it is determined whether or not the condition |Va−V|≧th is satisfied as the relationship between the reference evaluation value Va acquired in step S104 and the present evaluation value V acquired in step S105. If the determination in step S106 is negative, since the in-focus state is maintained, the present evaluation value V is updated in step S105, and the determination in step S106 is repeated.

Then, if the determination in step S106 is positive and the condition |Va−V|≧th is satisfied, the process proceeds to step S107.

In step S107, angle of view information is acquired. The angle of view information represents setting of an angle of view (zoom magnification) corresponding to the present position of the zoom lens 12. This information can be acquired, for example, in accordance with a detection signal from a sensor provided in the lens block 1 and representing the position of the zoom lens 12, rotational position information of the zoom motor 8a, or the like.

In step S108, the rate of an evaluation value change is calculated and acquired. The rate of the evaluation value change represents the ratio of a change of an evaluation value V per unit time before the determination in step S106 is positive with respect to, for example, the reference evaluation value Va. The rate of the evaluation value change is acquired from the present evaluation values V sampled during a period from a predetermined time before a point in time when the determination in step S106 is positive to the point in time when the determination in step S106 is positive by performing calculation based on a predetermined algorithm.

In step S109, the waiting time Tw is set in accordance with the angle of view information acquired in step S107 and the rate of the evaluation value change acquired in step S108.

An image pickup area increases as the angle of view increases. In contrast, an image pickup area reduces as the angle of view reduces. In accordance with a reduction in the angle of view, the amount of movement of an object in a picked-up image increases. In many cases, when a change that is not negligible occurs in a place photographed by a monitoring camera, the angle of view of the monitoring camera is likely to be reduced to increase the zoom magnification. Thus, in terms of the use of the monitoring camera, it is desirable that the waiting time Tw, which corresponds to an angle of view, be set to be longer when the angle of view is wider than a reference angle of view and be set to be shorter when the angle of view is narrower than the reference angle of view.

In addition, the fact that the rate of the evaluation value change is high means that the content of a picked-up image significantly changes per unit time. In this case, in terms of the use of the monitoring camera, a change that is not negligible is likely to occur in a photographed place. Thus, in this case, it is desirable that the waiting time Tw be set to be shorter when the rate of the evaluation value change is higher. Accordingly, an automatic focus operation can be performed relatively immediately in response to a relatively large change of an object.

After the waiting time Tw is set in step S109, a waiting operation based on the waiting time Tw starts in step S110. In step S110, it is determined whether or not the waiting time Tw passes. If it is within the waiting time Tw and the determination in step S110 is negative, the process proceeds to step S111. In step S111, in accordance with the trigger timing in the predetermined cycle set in advance, an evaluation value at the present time captured from the evaluation value generator 4 is acquired as a present evaluation value V. Then, in step S112, it is determined whether or not the condition $|Va-V| \geq th$ is satisfied in accordance with the present evaluation value V acquired and updated in step S111 and the reference evaluation value Va acquired in step S104.

If the determination in step S112 is positive, the process returns to step S110.

In contrast, if the determination in step S112 is negative, the process returns to step S105. The fact that the determination in step S112 is negative means that the amount of change of the present evaluation value V is returned to be less than the threshold value th while the process is waiting for restart of the automatic focus operation during the waiting time Tw. In this case, the waiting operation based on the waiting time Tw stops, and the process returns to step S105 to detect again whether or not the amount of change of the present evaluation value V is less than the threshold value th.

In contrast, for example, if the waiting time Tw passes and the waiting operation ends while maintaining a state in which the condition $|Va-V| \geq th$ determined in step S106 is satisfied, the determination in step S110 is positive. In this case, the process returns to step S101 to restart the automatic focus control.

With the procedure and algorithm for starting the automatic focus control, the automatic focus control does not respond to a change in a temporal (short-time) focus status for a period not exceeding the waiting time Tw, and a state in which the automatic focus operation stops can be maintained. Thus, the frequency of the automatic focus operation during a predetermined period can be significantly reduced. Thus, for example, mechanical wear and degradation of the focus mechanism unit 6 can be reduced, and more durability and reliability can be achieved.

In addition, the focus motor 6a is worn out or degraded the most in the focus mechanism unit 6. With the structure in this embodiment, the wear and degradation of the focus motor 6a can be effectively suppressed.

Photographing using, for example, monitoring cameras is not performed to create video work. Monitoring cameras are used for monitoring circumstances. Thus, a highly real-time and highly accurate automatic focus operation need not be performed in response to a relatively small change of an evaluation value (a focus deviation). Thus, even if a delay corresponding to the waiting time Tw occurs for an automatic focus operation, as in this embodiment, a particular problem does not occur as long as the waiting time Tw is set properly. In addition, the basic algorithm of the procedure for starting the automatic focus control in this embodiment is simple such that the automatic focus operation restarts after waiting for a predetermined time from a point in time when the automatic focus operation should originally start. Thus, the load of program design can be reduced. In addition, a special image signal processing circuit used for the automatic focus operation need not be added.

As described with reference to FIG. 5, in this embodiment, the waiting time Tw can be automatically and variably set in accordance with an angle of view and the rate of an evaluation value change. When such an algorithm is actually mounted, for example, an image pickup condition or the content of a picked-up image, which requires high follow-up ability, can be satisfactorily handled.

The present invention should not be limited to the features described above.

For example, in the foregoing embodiment, an example in which automatic focus control based on a contrast method adopts a hill-climbing method is described. However, a wobbling method is also known as a contrast method, and automatic focus control using both the hill-climbing method and the wobbling method is widely adopted. The present invention is also applicable to automatic focus control using the wobbling method and to automatic focus control using both the hill-climbing method and the wobbling method.

In the foregoing embodiment, in a case where the amount of evaluation value change is returned to less than the threshold value th for restarting the automatic focus operation during a period for waiting for the waiting time Tw, the waiting operation stops and it is detected again whether or not the amount of evaluation value change is less than the threshold value. However, depending on the case, when once it is detected that the amount of evaluation value change is less than the threshold value th, the automatic focus operation may always restart without any condition after the waiting time Tw passes.

In addition, although an example in which the configuration of focus control based on the present invention is applied to a video camera apparatus used in a monitoring camera system is described in the foregoing embodiment, the configuration of the focus control may also be applied to purposes other than the video camera apparatus in the monitoring camera system according to need. In addition, depending on the case, the present invention is applicable not only to a video camera photographing and recording motion but also to a still camera.

It should be understood by those skilled in the art that various modifications, combinations, sub-combinations and alterations may occur depending on design requirements and other factors insofar as they are within the scope of the appended claims or the equivalents thereof.

The invention claimed is:

1. A focus control device, comprising:
   lens means including a focus lens;
   a focus lens driving mechanism that moves the focus lens to achieve an in-focus state;
   focus status detection means for detecting a focus status acquired by the focus lens;
   drive control means for controlling the focus lens driving mechanism so that the detected focus status is the in-focus state;
   change detection means for detecting that an evaluation value for focus control has changed from a value corresponding to the in-focus state by a predetermined threshold value or more in accordance with the detected focus status; and
   execution control means for waiting in a state in which the drive control means does not control the focus lens driving mechanism for a predetermined waiting time starting from a point in time when the change detection means detects that the evaluation value has changed by the predetermined threshold value or more, and for causing the drive control means to control the focus lens driving mechanism when it is recognized that the state in which the evaluation value has changed by the predetermined threshold value or more is maintained until the waiting time has elapsed in accordance with a detection result acquired from the change detection means.

2. The focus control device according to claim 1, further comprising:
waiting time setting means for setting the waiting time,
wherein the lens means further includes a zoom lens for changing an angle of view, and
wherein the waiting time is set in accordance with the angle of view acquired by the zoom lens.

3. The focus control device according to claim 1, further comprising waiting time setting means for setting the waiting time in accordance with a rate of change of the evaluation value per unit time.

4. A focus control method, comprising:
detecting a focus status acquired by a focus lens;
controlling a focus lens driving mechanism to move the focus lens in accordance with the detected focus status so as to achieve an in-focus state;
detecting that an evaluation value for focus control has changed from a value corresponding to the in-focus state by a predetermined threshold value or more in accordance with the detected focus status; and
waiting in a state in which the controlling step does not control the focus lens driving mechanism for a predetermined waiting time starting from a point in time when the change detecting step detects that the evaluation value has changed by the predetermined threshold value or more, and causing the controlling step to control the focus lens driving mechanism when it is recognized that the state in which the evaluation value has changed by the predetermined threshold value or more is maintained until the waiting time has elapsed in accordance with a detection result acquired from the change detecting step.

5. A focus control device, comprising:
a lens unit including a focus lens;
a focus lens driving mechanism that moves the focus lens to achieve an in-focus state;
a focus status detector that detects a focus status acquired by the focus lens;
a drive control unit that controls the focus lens driving mechanism so that the detected focus status is the in-focus state;
a change detector that detects that an evaluation value for focus control has changed from a value corresponding to the in-focus state by a predetermined threshold value or more in accordance with the detected focus status; and
an execution control unit that waits in a state in which the drive control unit does not control the focus lens driving mechanism for a predetermined waiting time starting from a point in time when the change detector detects that the evaluation value has changed by the predetermined threshold value or more, and that causes the drive control unit to control the focus lens driving mechanism when it is recognized that the state in which the evaluation value has changed by the predetermined threshold value or more is maintained until the waiting time has elapsed in accordance with a detection result acquired from the change detector.

* * * * *